United States Patent

[11] 3,585,840

[72] Inventor Clifford A. Landsness
Akron, Ohio
[21] Appl. No. 857,064
[22] Filed Sept. 11, 1969
[45] Patented June 22, 1971
[73] Assignee The B. F. Goodrich Company
New York, N.Y.

[54] FORCE GENERATOR
6 Claims, 3 Drawing Figs.
[52] U.S. Cl. .................................................. 73/1
[51] Int. Cl. ............................................ G01l 25/00
[50] Field of Search ............................................. 73/1 B

[56] References Cited
UNITED STATES PATENTS
2,789,427 4/1957 Brier ........................... 73/1

3,034,330 5/1962 Jaworowicz .................. 73/1

*Primary Examiner*—S. Clement Swisher
*Assistant Examiner*—William A. Henry, II
*Attorneys*—W. A. Shira, Jr. and Harold S. Meyer ABSTRACT: An apparatus for generating a force of constant amplitude and changing direction for calibrating force-sensing instruments. A resilient rod with a bearing surface provided on the free end of the rod is anchored to the instrument to be calibrated in cantilever arrangement. An eccentric is provided on one end of a shaft with the bearing surface of the rod received therein and the end of the rod is orbitally oscillated by shaft rotation thereby providing a predetermined force input to the instrument.

PATENTED JUN22 1971 3,585,840

INVENTOR.
CLIFFORD A. LANDSNESS
BY
ATTY.

3,585,840

FORCE GENERATOR

BACKGROUND OF THE INVENTION

In the manufacture of pneumatic tires for passenger car service it is necessary to provide tires that are within prescribed limits of variation in the radial forces applied to the axle of the rotating wheel on which the tire is mounted. One common method employed for determining the variation of radial force attributable to a given tire, is rotational testing of the completed tire on a tire "uniformity" test machine. In this type of test machine, the tire is mounted on a wheel rim and rotated in the inflated state at a constant speed while a movable load wheel is held in contact with the tread of the rotating tire.

The load wheel of the uniformity machine is resiliently mounted such that the load wheel axle is permitted to move small distances in proportion to the variation in the load resistance of the tire rotating in contact with the load wheel. Sensors, usually of the electrical transducer type, are attached to the resilient mounting of the load wheel axle for detecting movements thereof and emitting varying electrical signals the voltage of which is proportional to the load wheel movement and, hence, proportional to the force exerted on the load wheel by the tire tread.

In order to calibrate the output of the transducers, it is necessary to provide a force input of known and constant amplitude and varying directions. Heretofore, providing a force of constant amplitude and changing direction for calibrating a force-indicating instrument has been a difficult task since many of the more common mechanical motion generators produce a movement of fixed frequency and amplitude, but with a changing force output due to the varying velocities of the elements of the mechanism. Reciprocating, crank-type and similar types of oscillating motion generators are unsuitable because the moving members have variable velocities and accelerations during each motion-producing cycle of the generator.

Since the forces produced on the moving members of a machine are proportional to the accelerations of the moving members, a constant force will be produced only when the accelerations are constant.

The requirement for oscillating motion of constant acceleration precludes the use of such common types of motion-generators as those having reciprocating or sinusoidal output. This has made quite difficult the design of a motion generator having a force output of constant amplitude but varying direction or calibrating a force-sensing instrument.

A further difficulty encountered in designing a constant force generator for calibrating instruments, is that of providing such a generator which is portable and sufficiently small in size and light in weight as to be conveniently attached to the instruments to be calibrated without the necessity for removing the force-sensing instrument from the machine with which it is associated.

For example, in the tire uniformity testing machine, it is desirable to calibrate the sensor under conditions most closely simulating a force input from the tire to the load wheel. Therefore, the sensor must be calibrated in its installed position on the uniformity machine and the force generating device must be sufficiently portable to be brought to the uniformity machine location and attached thereto for calibration of the transducer.

SUMMARY OF THE INVENTION

The present invention provides a solution to the above-described problem by providing a means for generating a force at a constant amplitude and changing direction at a predetermined frequency. In addition, the force generator of the invention herein disclosed and claimed is sufficiently portable that it may be carried to the location of he machine on which it is desired to calibrate a force-sensing instrument.

In operation, a rigidly mounted resilient rod extends in cantilevered arrangement from the instrument to be calibrated. The free end of the rod is attached to a rotating eccentric such that the nd of the rod orbits continuously about the center line of the center of rotation of the eccentric. When the free end of the rod is orbiting, the anchored rod end thus transmits, by means of reaction forces through its mounting, a force of constant amplitude to the instrument to b calibrated.

An adjustment is provided on the eccentric to change the diameter of the orbit of the rod end and thus alter, as desired, the amplitude of the force variation.

DETAILED DESCRIPTION

Figure 1:
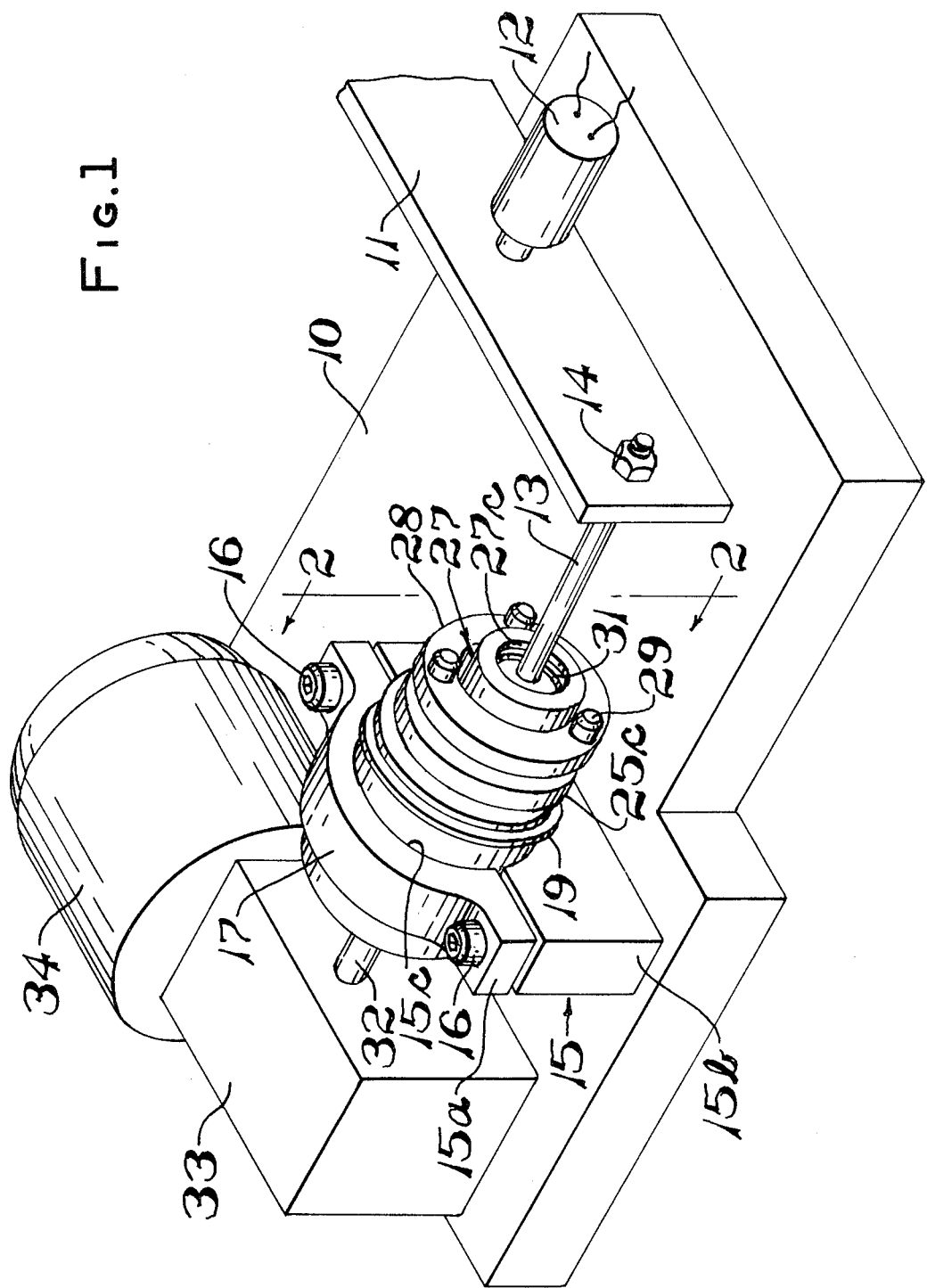
FIG. 1 is a perspective view of the force generator attached to the flex plate with attached sensor of the machine being tested.

Referring now to FIG. 1, the force generator is illustrated as mounted on a baseplate 10 which is attached to a tire uniformity test machine (not shown) such that the plate 10 is attached to the frame of the test machine and thus has a common reference with an instrument-mounting plate 11 which plate is also part of the uniformity test machine. In the presently preferred practice, the late 11 usually comprises part of the resilient mounting means for the axle of the load wheel of the uniformity machine. A sensor 12, which is to b calibrated, is attached to the plate 11 for providing an indication of the variation in the forces applied to the plate. In the case of the tire uniformity test machine, the sensor 12 is preferably an electrical transducer disposed to indicate only variations in the force of the load wheel in contact with the tire to be tested. However, in applications other than a tire uniformity test machine, the sensor 12 will be whatever sensing means is used to indicate force variation of the plate. In the following description, reference will b made to the tire uniformity test machine and the sensor for indicating tire force variation. However, it will be understood that the plate 11 and sensor 12 may be portions of a different type apparatus and sensor other than a tire uniformity machine, wherein it is desired to indicate the variation in oscillating force.

A rod 13, preferably of steel or other similarly high tensile modulus material, is rigidly anchored to the plate 11 extending in cantilevered arrangement therefrom and is disposed generally parallel to the generator-mounting plate 10. In the presently preferred embodiment, the rod 13 has a register portion, for example a shoulder formed on the en anchored to the plate and is received in a hole in the plate. A nut 14 is threaded over the end of the rod extending through the plate thus drawing the shouldered portion of the rod firmly against the side of the plate opposite the nut 14. The rod 13 has a spherical bearing surface 13a (shown in FIG. 3) formed on the unanchored end thereof with the diameter of the spherical surface adapted to be received in a slip-fitting manner in the inner race of a bearing.

A bearing mount 15 is rigidly attached to the baseplate 10 and has a releasable mechanism for securing a bearing assembly therein. In the presently preferred embodiment, the mount 15 comprises a block split into an upper and lower half 15a and 15b respectively, with each half secured to the plate 10 and the releasable mechanism comprises bolts 16 passing therethrough and into engagement with threaded holes in plate 10. A bearing-receiving bore 15c is provided through the mount 15 such that the bore is split b the parting line between halves 15a and 15b.

Figure 2:
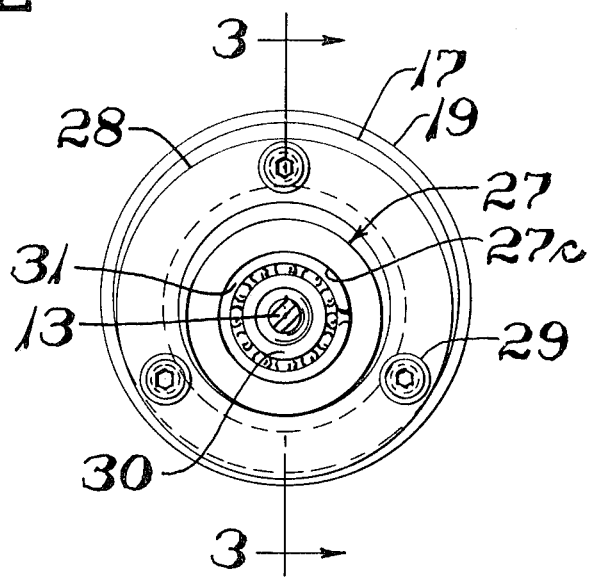
FIG. 2 is a portion of a sectional view taken along the section-indicating lines 2-2 of FIG. 1.
Figure 3:
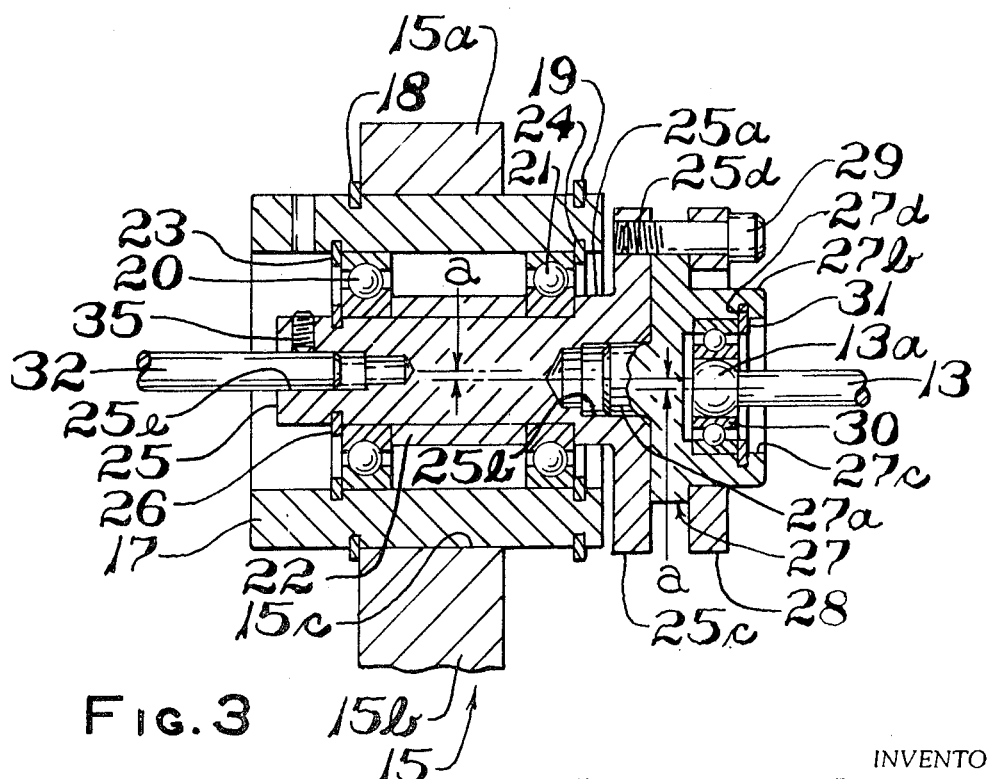
FIG. 3 is a partial sectional view taken along section-indicating lines 3-3 of FIG. 2.

Referring now to FIGS. 1, 2, and 3, a rigid, generally cylindrical, bearing housing 17 is received in the bore 15c of the bearing mount and secured therein by tightening of the bolts 16 such that the inner diameter of the mount halves 15a and 15b contact the outer diameter of the bearing housing 17 before complete contact is made along their respective parting faces, thus providing an interference fit therebetween with the bolts 16 providing the clamping force between the bearing housing and bearing mount. The bearing housing has a pair o axially spaced circumferential grooves formed on its outer periphery, which grooves each have a snap ring 18,19 received therein. When the bolts 16 are loosened the bearing housing 17 may be slidably moved axially in the bearing mount with the axial movement of the housing 17 limited by the snap rings 18 and 19.

The bearing mount is preferably positioned on the baseplate 10 such that the bearing-receiving bore 15c has its axis coincident with the longitudinal axis of rod 13, extending from the plat 11 on the instrument to be calibrated, with the bearing mount spaced axially from the free end of the rod.

A pair of spaced ball bearings 20 and 21 are received in the bore of the housing 17 and are maintained in spaced arrangement by a spacer 22 disposed axially intermediate the bearings. Removal of the bearings from the housing 17 is prevented by a pair of snap rings 23 and 24 each disposed in a circumferential groove in the housing bore, with one of the snap rings adjacent the axially outer face of each bearing respectively.

A rotor 25, having its outer periphery adapted to closely interfit the inner races of the bearings 20 and 21 is received in the bore of the bearings in a closely fitting arrangement. The rotor 25 is releasably secured axially in the bearings in a manner preventing inadvertent removal therefrom. A shouldered portion 25a is formed on the end of the rotor adjacent the free end of rod 13 which shoulder contacts the axially outer face of the adjacent bearing. A snap ring 26 is received in a circumferential groove, formed in the outer periphery of the rotor closely adjacent the axially outer face of the bearing 20 opposite shoulder 25a, thereby securing the rotor axially in the bearings.

The rotor 25 has a counterbore 25b formed in the end face thereof adjacent the free end of rod 13. The counterbore 25b is eccentric with the axis of rotation of the rotor by an amount, as shown in FIG. 3, as dimension $a$. The rotor has a flange 25c extending perpendicularly to the rotor axis in a radially outward direction from the shoulder 25a. The flange 25c has a plurality of axial threaded holes 25d disposed therein in circumferentially equally spaced arrangement adjacent the outer periphery thereof.

The end face of the rotor opposite the counterbore 25d has a counterbore 25e formed therein, which is adapted to receive a power transmission shaft. The counterbore 25e is formed in the rotor concentric with the bearing surfaces on the outer periphery. A generally cylindrical disc member 27 having a cylindrical portion 27a has said portion received in the counterbore 25a in the rotor in a closely fitting arrangement with the face of the disc 27 making contact with the end face of the rotor 25. A second cylindrical portion 27b is provided on the opposite axial end of the disc 27, the cylindrical portion 27b having a larger diameter than the cylindrical portion 27a and being adapted to have a retaining ring seated therein. The end face of disc 27 adjacent rod 13 has a counterbore 27c formed therein, which counterbore is eccentric to the cylindrical portion 27a by a predetermined amount. Preferably, the amount of eccentricity of the counterbore 27c with the shoulder 27a is the same as that of the dimension $a$ for the eccentricity of counterbore 25b with the outer periphery of the rotor. Hence, if disc 27 is rotated relative to the rotor 25, the counterbore 27c will have an eccentricity of from zero to 2a as the disc 27 is rotated one full turn within the counterbore 25c, thus a variable eccentric is provided. This feature provides a means of predetermining a desired eccentricity and thus the orbital radius of the force generator rod 13.

A retaining ring 28, having a bore slip-fitting over cylindrical portion 27b is assembled over the disc 27 and is retained thereon by bolts 29 passing through holes in the retaining ring and engaging the threaded holes 25d on the flange 25c. Thus, the disc 27 may be rotated to the desired degree of eccentricity and the bolts 29 tightened to secure the disc to the rotor and maintain the desired eccentric setting. A bearing 30 is received in closely fitting arrangement in counterbore 27c and retained therein by a snap ring 31 inserted into a circumferential groove 27d formed in the counterbore 27c.

In assembling the force generator the rotor, bearings and disc are assembled into the bearing housing 17 and inserted into the bearing mount. The bearing housing 17 is assembled for axial sliding movement in the bearing mount and the position therein secured by tightening bolts 16 and thereby clamping the bearing mount over the housing. A shaft 32 is inserted into the counterbore 25e and secured therein by a setscrew 35 such that relative rotation between the rotor 25 and shaft 32 is prevented. The power shaft in the preferred embodiment is attached to a transmission 33 and drive motor 34 which are anchored to the baseplate 10.

The force generator is operatively engaged with the instrument to be calibrated sliding the bearing housing 17 axially in the mounting bore 15c toward the rod 13 until the bearing surface 13a is received in the bearing 30. Bolts 16 are then tightened thereby securing the halves 15a and 15b of the mount in clamping engagement with housing 17. Thus axial movement of the housing 17 is prevented and hence disengagement of the rod with the eccentrically rotatable bearing 30.

In operation, rotation of the transmission shaft 32 by the motor causes the rotor 25 to rotate in the bearings 20 and 21 thus rotating the bearing 30 about the spherical end 13a of the rod. If the disc 27 is positioned such that counterbore 27c is not concentric with the outer periphery of the rotor rotating in the bearings, the free end of the rod 13a is caused to orbit about the center of the drive shaft 32. Orbiting of the end of the rod causes a continuous cantilev deflection of the rod in any axial plane taken through the anchored end of the rod. Given the amount of deflection of the rod end 13a, the reaction loads, and thus the force input to the instrument, may be computed from standard formulas for the deflection of a cantilevered rod where the tensile modulus, diameter, and length of the rod are known. From standard stress formulas for the deflection of cantilevered rods, the load on the end of the rod required to deflect the rod an amount equal to the eccentricity of the bearing 30 will thus be the force applied to the rod by the force generator and hence, the force transmitted to the instrument can be determined.

In the presently preferred practice, the entire assembly comprising the base plate 10, motor 34, transmission 33, and bearing mount 15, are made sufficiently small such that baseplate 10 may be attached conveniently to the machine to be calibrated and the bearing 30 engaged with the end 13a of the rod 13 which is premounted on the instrument to be calibrated. Thus, the invention permits an instrument for measuring force variation to be calibrated in its position without moving the instrument from the machine or system to which it is attached.

In the presently preferred practice of the invention, the rod 13 has a diameter of approximately 0.260 inch and extends a length of preferably 3.25 inches from the instrument to which it is mounted. The eccentricity $a$ is preferably adjusted to an amount equal to 0.042 inch and deflection of the end of the rod by this amount requires a 30-pound force applied perpendicularly to the end of the rod at the bearing surface 13a. In the preferred practice of the invention, the rod 13 is made of steel, but it should be noted that other materials of similar high tensile modulus may be employed to provide different lateral "spring rates" to the rod 13. Furthermore, the rod need not be formed to the presently preferred dimensions employed for the tire uniformity test machine, but may be made to the length-to-diameter ratio required for the particular material to give the proper lateral spring rate for the desired cantilever deflection at its free end.

The apparatus described herein thus generates an oscillating force of constant amplitude and changing direction by providing orbiting motion t the free end of a cantilevered rod.

Modifications of the invention may be made within the scope of the invention b those having ordinary skill in the art, the invention being more particularly defined in the attached claims.

I claim:

1. an apparatus for generating a force of constant amplitude but continuously changing direction comprising:
   a. rod means having one end adapted to be rigidly yet releasably attached to the flexible late of an instrument to be tested and extend therefrom in cantilevered arrangement, the said rod means having a bearing surface thereon;
   b. a rotatable member to receive said rod-bearing surface n a manner permitting relative rotation therebetween;
   c. means operatively engaging said rotatable member moving same in a circular orbit eccentrically about an axis passing through the point of attachment of the rod to said flexible plate thereby causing orbital cantilever deflection of said rod.

2. The apparatus defined in claim 1, wherein said rotatable member includes means for adjusting the radius of said circular orbit from zero to a maximum predetermined value.

3. The apparatus defined in claim 2 wherein said means for orbitting said rotatable member comprises:
   a. base means;
   b. a shaft means rotatably mounted on said base means with the axis thereof disposed generally parallel to said rod means and said shaft means having said rotatable member received in the end thereof.

4. The apparatus defined in claim 3, wherein said shaft means comprises:
   a. a rotor having a circular flange extending radially outwardly from the end adjacent the bearing surface of said rod means; and,
   b. disc means rotatably mounted eccentrically on the end face of said rotor flange, said disc having said rotatable member mounted on the face thereof eccentrically with respect to the mount to said rotor wherein the said adjustment in the radius of the circular orbit is provided by rotating said disc with respect to said rotor such that the said eccentricity of said rotatable member is varied.

5. The apparatus defined in claim 4, further comprising a locking means for preventing rotation of said disc with respect to said rotor.

6. The apparatus defined in claim 3, wherein said shaft means includes a second baring means rigidly but releasably attached to said base means with said rotor received therein in a manner permitting relative rotation therebetween.